Oct. 31, 1967  R. SZYMANSKI  3,350,557

FOG LENS ATTACHMENTS FOR VEHICLE HEADLIGHTS

Filed June 9, 1965

INVENTOR
Ronald Szymanski
BY
Morsell + Morsell
ATTORNEYS 3,350,557
FOG LENS ATTACHMENTS FOR VEHICLE HEADLIGHTS
Ronald Szymanski, 12913 W. Honey Lane,
New Berlin, Wis. 53151
Filed June 9, 1965, Ser. No. 462,547
1 Claim. (Cl. 240—46.57)

ABSTRACT OF THE DISCLOSURE

To facilitate driving in a fog or inclement weather tinted translucent lens attachments are provided which can be removably mounted over an automobile's headlights, said colored members increasing the penetrating powers of the headlights and providing greatly increased visibility in fog or the like. Each of said lens attachments has a circular magnet incorporated therewith which is designed to fit on and engage the metal retaining ring surrounding the headlight lens to hold said attachment in covering position on said headlight, and when said colored members are no longer needed they can be easily removed and stored in the automobile's glove compartment.

---

Figure 1:
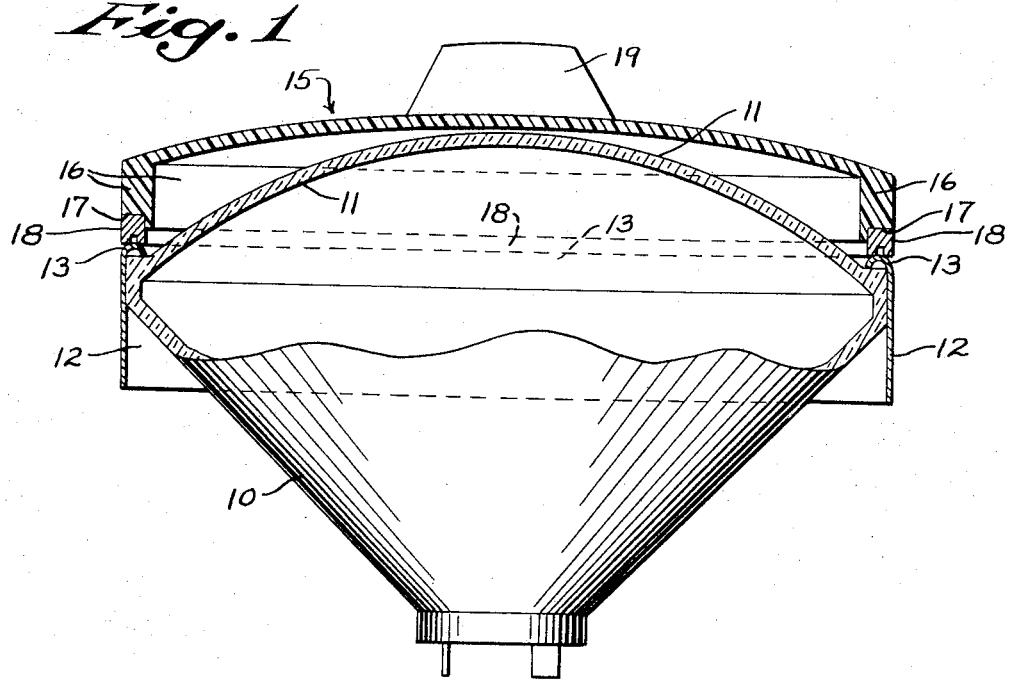

This invention relates to an improved fog lens attachment for vehicle headlights, and more particularly to a novel colored lens which can be detachably mounted on the headlights of any automobile or other vehicle to convert the same into fog lights.

As is well known, conventional vehicle headlights do not possess sufficient penetration through fog or rain to afford clear visibility, and for this reason it is advantageous to employ amber or yellow-colored lights when driving in such weather. Unfortunately, however, most automobiles are not equipped with fog lights, and the detachable fog lens devices heretofore designed for this purpose have not proven practical. With this in mind, the principal object of the present invention is to provide a simple but effective fog lens attachment which can be stored in the glove compartment or other convenient location in a vehicle, and which can be removed and quickly and easily mounted on the vehicle headlights when driving in foggy or inclement weather.

Further objects of the present invention are to provide an improved fog lens attachment for vehicle headlights which is relatively inexpensive in design, which is simple to use, which is durable in construction, and which is otherwise particularly well adapted for its intended purposes.

With the above and other objects in view, which other objects and advantages of the present invention will become apparent hereinafter, the invention comprises the improved fog lens attachment for vehicle headlights described in the following specification, and all of its parts and combinations as set forth in the claim and all equivalents thereof.

Figure 2:
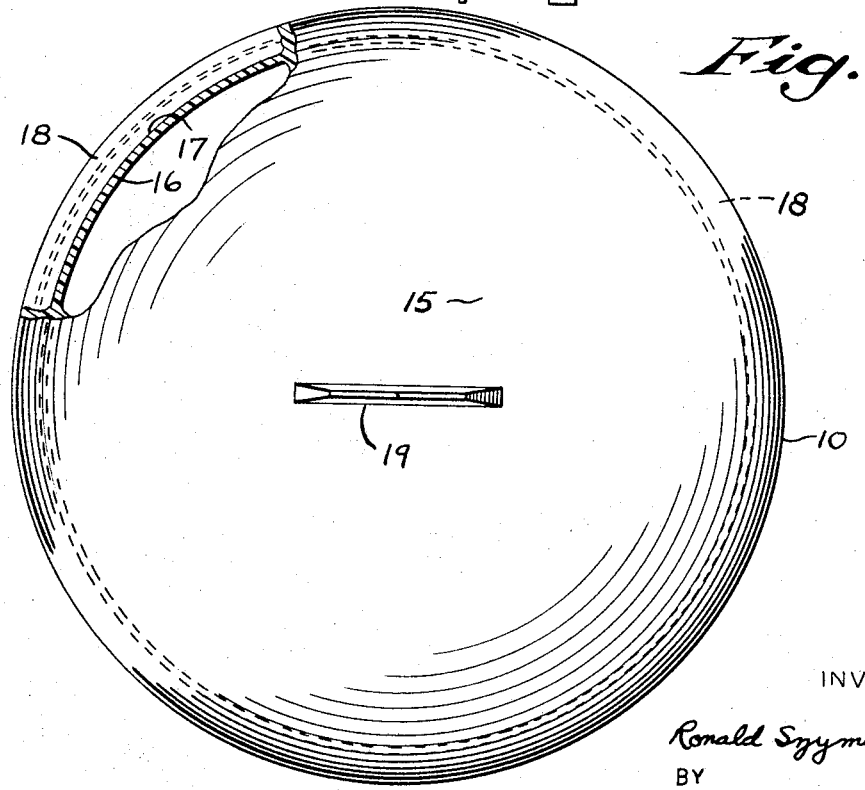

In the accompanying drawing, illustrating a preferred embodiment of the invention, and wherein like reference numerals designate the same parts in both of the views:

FIG. 1 is a side elevational and sectional view of a conventional vehicle headlight with the improved fog lens attachment mounted thereon; and FIG. 2 is a plan view of said headlight, with a portion of the fog lens attachment broken away and shown in section.

Referring now more particularly to FIG. 1 of the drawing, illustrated therein is a conventional vehicle headlight 10 including the usual convex lens 11, there ordinarily being sets of either two or four of said headlights mounted in the front of the vehicle. Each of said headlights is carried in an opening or well provided therefor in the front of the vehicle and is held in position by means of a steel retaining ring 12 having a protruding rim portion 13 which clampingly engages the periphery of said headlight lens.

The novel fog lens attachment 15 comprising the present invention is of a diameter corresponding to the diameter of the particular style of headlight with which it is to be used, and is preferably injection molded of a high-heat, transluscent or transparent acrylic plastic. It is to be understood, however, that numerous other suitable plastics or plastic-like materials could be employed, so long as they have high heat resistant properties adapted to withstand the intense heat created by the headlight, and the invention is not to be limited or confined in this respect. Moreover, while it is preferred to use a lens which is amber or yellow in color, other colors having effective filtering properties could also be employed, and while a single size lens attachment has been illustrated it is to be understood that said fog lens devices will be made to accommodate both of the common headlight size in present use, as well as any other desired sizes. In short, what is intended to be covered herein is not only the specific form of the invention shown and described, but also any and all variations or modifications thereof as come within the spirit of said invention.

As best appears in FIG. 1, said plastic lens 15 is molded to form a concavo-convex body portion adapted to overlie the headlight lens 11, and formed integrally on said body is a transverse peripheral rim or flange 16. Said concavo-convex lens is formed on a radius of curvature greater than that of the headlight lens, and is so designed that the peripheral flange 16 thereon is adapted to be positioned adjacent and coextensive with the aforementioned metal rim 13 surrounding the periphery of said headlight.

With reference still to FIG. 1 of the drawing, it will be seen that said inwardly-projecting flange 16 on the lens attachment is provided with an annular cutout or recess 17 extending therearound and opening in its outer surface, and molded or otherwise permanently secured within said cutout portion is a magnetized metal ring 18, said ring being bifurcated in cross section to provide the magnetic poles. With said circular magnet 18 mounted therein it is possible to merely position the lens attachment comprising the present invention over a conventional auto headlight, as shown in FIG. 1, and the mutual attraction of said magnet and the steel retaining rim 12 will cause said plastic lens member to automatically securely attach itself in position overlying said headlight. Thus, there is provided secure but quickly removable attachment means for said fog lens.

To facilitate the installation and removal of the novel fog lens attachment a tab 19 is formed on and projects outwardly from the central portion of said lens, thereby permitting a user to readily grasp the same, and because said tab is relatively thin and inconspicuous in design it does not materially interfere with the light transmission through said lens.

From the foregoing detailed description it will be seen that the present invention provides an improved fog lens attachment for automobiles and other vehicles which is a definite improvement in the art. With the present invention a motorist can quickly and easily install the colored lens attachments over his headlights in the event he has to drive in foggy or inclement weather, and when said fog lenses are no longer required he can remove them in a matter of seconds. When said lens attachments are not being used they can be stored in the glove compartment of the car, and it can be locked to prevent their theft. In addition to its obvious utility, the novel fog lens comprising the present invention is also durable and long-lasting, and it is relatively inexpensive to manufacture.

It is to be understood, of course, that various changes and modifications in the structure hereinabove described will undoubtedly occur to those familiar with the art, and all of such changes or modifications are intended to be covered herein. It is contemplated, for example, that numerous materials might be utilized to form the lens attachment, and various colors having suitable filtering properties could be used. Moreover, and as hereinbefore mentioned, the size of said fog lens can be varied to suit the requirements of particular headlight styles, either present or future. In short, what is intended to be covered herein is the illustrated form of the invention and also any and all modifications thereof as may come within the scope of the following claim.

What I claim is:

In combination with a vehicle headlight having a convex lens, and having an annular metal retaining ring securing said light to the vehicle, said retaining member including a protruding rim clampingly surrounding the periphery of said headlight lens, a detachable fog lens assembly comprising: a translucent colored lens molded of high heat plastic material, said plastic lens attachment being of substantially the same diameter as said headlight, and being concavo-convex in shape and formed on a radius of curvature greater than that of said headlight lens; an integral flange formed around the circumference of said plastic lens positionable on said metal retaining rim, said flange having an annular cutout opening in its face; a circular magnet permanently secured in said annular flange cutout, said circular magnet being engageable with the protruding rim portion of said metal retaining ring to removably secure said colored lens in covering relation on said vehicle light; and a tab formed on and projecting from the central exterior portion of said lens attachment to facilitate its installation and removal from the headlight.

References Cited

UNITED STATES PATENTS

| | | | |
|---|---|---|---|
| 2,530,685 | 11/1950 | Davis et al. | 240—46.59 |
| 2,744,187 | 5/1956 | Moak | 240—46.59 |
| 3,283,143 | 11/1966 | Gosnell | 240—52.15 |

FOREIGN PATENTS

| | | |
|---|---|---|
| 379,004 | 3/1940 | Italy. |

NORTON ANSHER, *Primary Examiner.*

RICHARD M. SHEER, *Assistant Examiner.*